United States Patent [19]

Yamada et al.

[11] Patent Number: 5,024,117
[45] Date of Patent: Jun. 18, 1991

[54] APPARATUS FOR SUPPORTING SHIFT LEVER FOR TRANSMISSION

[75] Inventors: Ichiji Yamada, Toyota, Japan; Yutaka Inuzuka, West Bloomfield, Mich.; Michiyuki Murakami, Toyoake; George Suzuki, Chiryu; Tyo Tanahashi, Aichi; Takeshi Kondo, Nagoya, all of Japan

[73] Assignees: Toyota Jidosha Kabushiki Kaisha, Toyota; Tsuda Industries Company, Ltd., Kariya, both of Japan

[21] Appl. No.: 496,942

[22] Filed: Mar. 21, 1990

[30] Foreign Application Priority Data

Mar. 30, 1989 [JP] Japan ................ 1-37014[U]

[51] Int. Cl.⁵ ............ G05G 8/16; F16C 11/06; F16D 1/12
[52] U.S. Cl. .................. 74/473 P; 403/114
[58] Field of Search .......... 403/114, 115, 131, 141; 74/473 P, 473 R, 471 XY

[56] References Cited

U.S. PATENT DOCUMENTS

| | | | |
|---|---|---|---|
| 2,100,642 | 11/1937 | Geyer | 74/473 P |
| 3,482,465 | 12/1969 | Lusted | 74/473 P X |
| 4,457,188 | 7/1984 | Hauser | 74/473 R X |
| 4,603,598 | 8/1986 | Tsuji et al. | 74/473 P |
| 4,873,884 | 10/1989 | Yamada et al. | 74/473 P |

Primary Examiner—Richard E. Moore
Attorney, Agent, or Firm—Oblon, Spivak, McClelland, Maier & Neustadt

[57] ABSTRACT

An apparatus is provided for supporting a shift lever for a transmission the shift lever including a ball-like portion which is on the shift lever and has spherical surfaces of a fixed curvature at least on a part of the lower and upper sides. A receiving surface has a concave spherical surface of nearly the same curvature as the lower spherical surface of the ball-like portion and is in contact with the lower spherical surface, and a retaining surface has a concave spherical surface in surface contact with the upper spherical surface of the ball-like portion and holds the ball-like portion between the concave spherical surface and the receiving surface. A retaining member is installed from above to cover the ball-like portion, and an elastic displacement section is projectingly formed on the lower side of the retaining member to enclose the upper part of the ball-like portion and is elastically deformable in the radial direction of the ball-like portion. The retaining surface is formed on a part of the elastic displacement section which faces the ball-like portion. The ball-like portion is held in between the receiving surface and the retaining surface with the elastic force of the elastic displacement section, and a frictional force based on the elastic force acts as the shift-lever operating load.

5 Claims, 3 Drawing Sheets

APPARATUS FOR SUPPORTING SHIFT LEVER FOR TRANSMISSION

BACKGROUND OF THE INVENTION

1. Field of the Invention

This invention relates to a shift lever for a transmission and, more particularly, to an apparatus for supporting a shift lever used to control a floor remote control type transmission.

2. Description of the Prior Art

A floor-mounted shift lever is used to shift gears by manipulating in at least two directions, for example not only in a right-left direction but in a longitudinal direction intersecting perpendicularly to the right-left direction, and therefore the shift-lever supporting apparatus must have a construction that allows the shift lever to tilt in at least two directions. To give a vehicle driver an actual feeling of shift lever manipulation, the shift lever supporting apparatus is required to have some resistance in relation to a manipulation force and also to permit the smooth movement of the shift lever.

A shift lever supporting apparatus of prior art satisfying such a requirement is stated in Japanese Utility Model Registration No. 60-65829. A diagramatic representation of the construction of the apparatus is shown in FIG. 5. A shift lever 50 is provided with a ball portion 51, which is held between a pair of upper and lower seats 52. These seats 52 have a nearly semi-spherical inner surface in contact with the ball portion 51. Therefore, since the ball portion 51 can rotate in multiple directions in relation to the seats 52, the shift lever 50 is supported so as to be tiltable in at least two direction intersecting at right angles with each other. These seats 52 are accommodated inside of a cap 53 installed from above. Between the upper surface of the upper seat 52 and the inner surface of the cap 53 is installed an elastic member, for example a spring 54, in a compressed state. The cap 53 is fixedly mounted to a casing disposed thereunder, by fastening means (not shown) such as bolts. Accordingly, on the contact surfaces of the ball portion 51 and the seats 52 is acting a contact load by an elastic force of the spring 54. The above-mentioned actual feeling of manipulation of the shift lever 50 is afforded by a frictional force resulting from this contact load.

In the shift-lever supporting apparatus described above, therefore, the shift lever 50 is supported by five members in all including the pair of upper and lower seats 52, the spring 54, the cap 53, and the casing. To decrease a cost and to facilitate assembly operation, however, it is desired to reduce the number of component parts required.

The frictional force between the ball portion 51 and the seats 52 acts as a resisting force (an operating load) to a force required to operate the shift lever 50, giving the driver the actual feeling of manipulation of the shift lever 50. The frictional force, however, is largely affected by the dimensional accuracy and surface roughness of the outer surface of the ball portion 51 and the inner surface and the dimensional accuracy of the cap 53 give a great effect to the aforesaid frictional force. To set the frictional force to a design value, a higher machining accuracy is required, and consequently in the aforementioned prior-art apparatus the number of machining processes increases, resulting in low productivity and a high cost.

SUMMARY OF THE INVENTION

It is an object of this invention to provide an apparatus for supporting a shift lever which is capable of obtaining a stabilized operating load without requiring a high machining accuracy.

It is another object of this invention to provide an apparatus for supporting the shift lever comprising a reduced number of component parts which is capable of enhancing productivity and decreasing a production cost.

In order to accomplish these objects, this invention provides a shift-lever supporting apparatus for transmission which comprises a ball-like portion provided at an intermediate portion of the shift lever and having a spherical surface of a fixed curvature formed at least on a part of the lower side and on a part of the upper side, a receiving surface having a concave spherical surface of nealy the same curvature as that of the lower surface of the ball-like portion and in contact with the spherical surface of the lower side described above, and a retaining surface having a concave spherical surface in face contact with the spherical surface of the upper side of the ball-like portion described above and holding the ball-like portion between this spherical surface and the receiving surface. The ball-like portion has a retaining member to be installed to cover the ball-like portion from above, and an elastic displacement section which is elastically deformable in the radial direction of the ball-like portion. Furthermore the retaining surface is formed in a part opposite to the ball-like portion of the above-mentioned elastic displacement section.

A frictional pressure between the ball-like portion and the receiving surface and a frictional pressure between the ball-like portion and the retaining surface are provided by the elastic force of the elastic displacement section, and the frictional force between the ball-like portion and these surfaces serves as the shift lever operation load. Because a machining error is absorbed by the displacement of the elastic displacement section, no specially high machining accuracy is required, thereby facilitating assembling operation and lowering the cost.

Furthermore, according to the present invention, since a projecting portion is formed on the inner surface of a nearly cylindrical shift lever support section in which the ball-like portion is inserted and this projecting portion is provided with the receiving surface described above, the number of parts required can be decreased. In addition, in this invention, a retaining member having a cap section to be covered on the upper end opening section of the shift lever support section is formed and an elastic displacement section is formed integral with the lower surface of the cap section, the number of parts required can be further decreased, thus resulting in easier assembling operation and a lower cost.

The above and further objects and novel features of this invention will more appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIGS. 1 to 4 show one embodiment of the present invention, wherein:

FIG. 1 is a longitudinal sectional view of a portion supporting a shift lever;

FIG. 2 is a bottom view of a retaining member;

FIG. 3 is a sectional view showing the general structure of the shift-lever supporting apparatus;

FIG. 4 is an exploded view; and

DETAILED DESCRIPTION OF THE PREFERRED EMBODIMENTS

Figure 1:
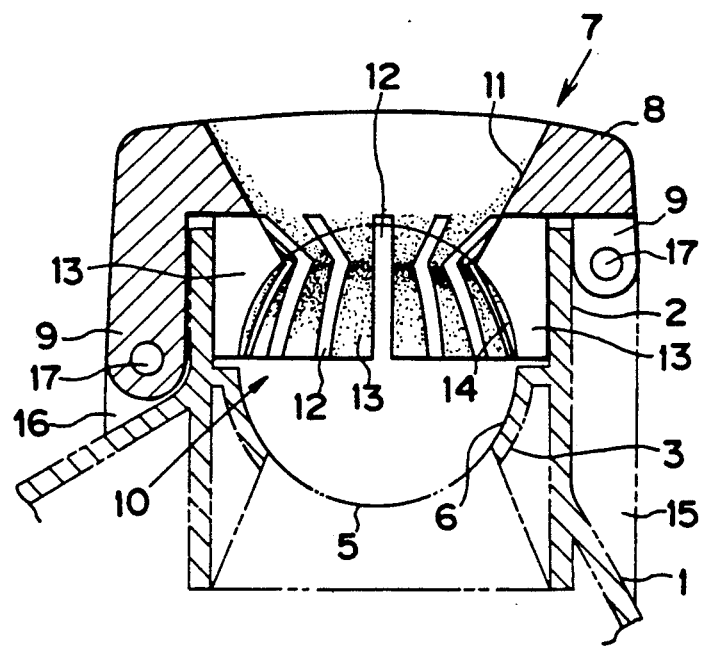

In FIG. 1, a shift-lever supporting apparatus body 1 is fixedly attached on a vehicle floor (not shown). This body 1 is provided integrally with a cylindrical shift-lever supporting section 2. On the inner peripheral surface of this shift-lever supporting section 2 is integrally formed a projecting portion 3. On this projecting portion 3 is formed a receiving surface 6 which has a concave spherical surface formed facing upward with nearly the same curvature as the ball portion 5 of the shift lever 4 described later and with which the ball portion 5 is in contact.

Numeral 7 denotes a retaining member. This retaining member 7 has a cap section 8 installed over the upper opening end of the shift-lever supporting section 2 and a flange section 9 located on the outer peripheral side of the shift-lever supporting section 2. On the lower surface of the retaining member 7 is integrally formed an elastic displacement section 10 which is fitted in the shift-lever supporting section 2. A shift lever hole 11 is formed vertically through the elastic displacement section 10 and the cap section 8. The upper part of this shift-lever mounting hole 11 is tapered, opening wider as it goes upward. In the elastic displacement section 10 are formed tongue sections 13 which are divided by many slits 12 along a direction nearly in parallel with the center axis of the shift lever 4 inserted in the shift-lever supporting section 2. The tongue sections 13, therefore, are of a cantilever type with the fixed end on the cap section 8 side and the free end at the lower end section, the free end being elastically displaceable. On the inner surface of the elastic displacement section 10, or on the inner surface of each tongue section 13, is formed a retaining surface 14 having a concave spherical surface of the same curvature as, or a slightly larger curvature than, the ball portion 5 of the shift lever 4. In other words, the inner diameter of the elastic displacement section 10 is the same as, or smaller than, the outer diameter of the ball portion.

Figure 2:
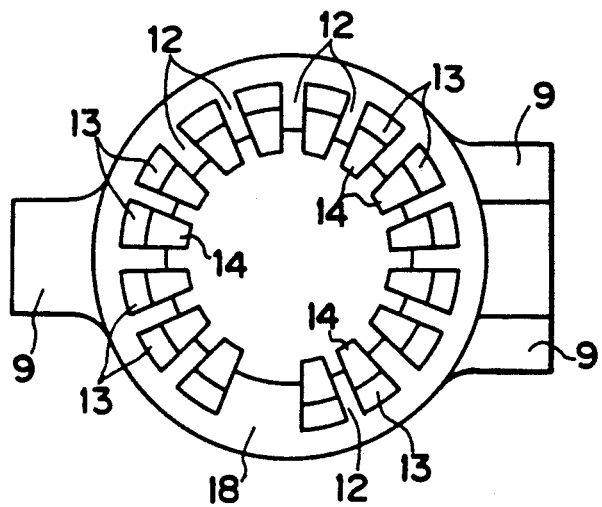

The retaining member 7 is secured to the body 1 by connecting one flange section 9 to the cap mounting section 15 of the body 1 and the other flange section 9 to the select bell-crank mounting section 16 through pins 17, thereby covering over the upper end section of the cylindrical shift-lever supporting section 2. The retaining member 7 is provided with a select lever inserting section 18 formed through in the radial direction as shown in FIG. 2.

Figure 3:
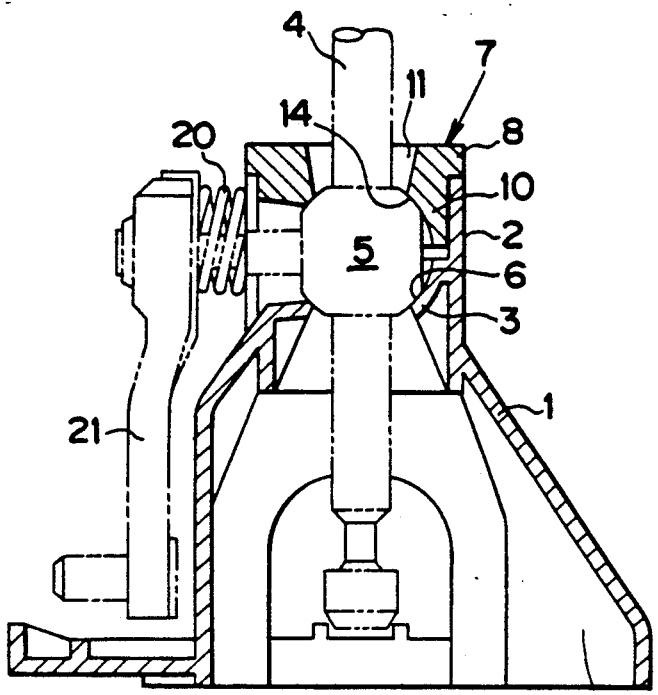
Figure 5:
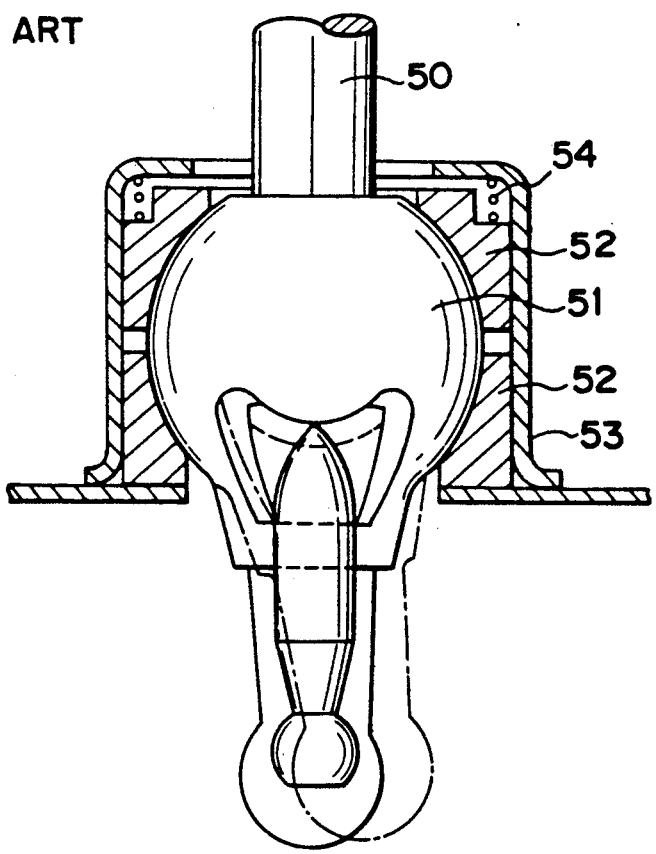
FIG. 5 is a longitudinal sectional view of a prior-art shift-lever supporting section.

Here, the shift lever 4 will be explained. This shift lever 4 has basically much the same structure as conventional ones, having a ball portion 5 formed at an intermediate portion of the shift lever 4 as shown in FIG. 3. This ball portion 5 is not fully spherical, but a spherical surface is formed at least partly on the lower side. This spherical surface and the above-described receiving surface 6 have nearly the same curvature, and accordingly the ball portion 5 is supported from below by the receiving surface 6 by holding both the surfaces in contact with each other. Also, the upper side of the ball portion 5 has a spherical surface of the same curvature as the lower-side spherical surface in at least a part thereof. Thus the ball portion 5 is rotatably held by pressing the retaining surface 14 of the elastic displacement section 10 to this spherical surface. As seen in FIG. 1, the tongue section 13 does not extend downward, relative to the ball-like portion, substantially below the upper portion of the ball-like portion.

The shift-lever supporting apparatus including the above-described constitution is assembled as described below.

Figure 4:
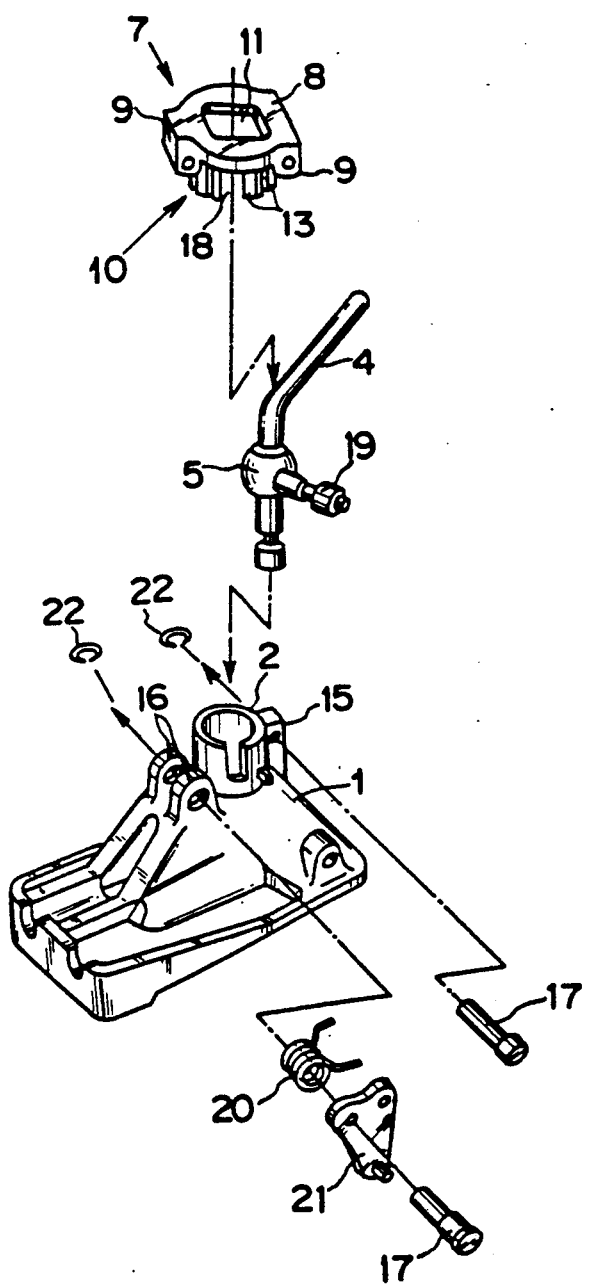

In FIG. 4, the shift lever is first inserted into the shift-lever supporting section 2; the ball portion 5 is set on the receiving surface 6; the retaining member 7 is set thereon; one flange section 9 is connected to the cap mounting section 15 by the pins 17; the other flange section 9 is connected to the select bell-crank mounting section 16 by the pins 17, thus securing the retaining member 7 to the body 1. In this case, it is necessary to align the select lever 19 radially projecting from the ball portion 5, with the select lever inserting section 18 formed in the retaining member 7. Prior to inserting the pins 17 into the select bell crank mounting section 16, the pins 17 are inserted into the through holes of the spring 20 and the select bell crank 21, and the spring 20 and the select bell crank 21 are attached to the select bell crank mounting section 16. In FIG. 4 the numeral 22 denotes a snap ring.

The ball portion 5 of the shift lever 4 thus assembled and supported is held by the elastic force of the elastic displacement section 10 between the receiving surface 6 and the retaining surface 14 such that the elastic displacement section 10 will be elastically deformed when pressed against the spherical surface. In consequence, a contact pressure between the ball portion 5 and the receiving surface 6 and between the ball portion 5 and the retaining surface 14 will increase, and accordingly a frictional force will act as a resistance or an operating load, against a force required to operate the shift lever 4.

The above-described constitution facilitates machining and assembling operations and obtains a stabilized operating load for the reason described below.

In the constitution described above, two kinds of fitting accuracies: a fitting accuracy of the retaining surface 14 and the ball portion 5 and a fitting accuracy of the shift-lever supporting section 2 and the elastic displacement section 10, have an influence on the operating load obtainable by the elastic displacement of the elastic displacement section 10. Of the fitting accuracies, the former fitting accuracy, that is, the fitting accuracy of the retaining surface 14 and the ball portion 5, is required to be high enough to allow the elastic deformation of the elastic displacement section 10 when the retaining surface 14 is pressed against the ball portion 5. In other words, the curvature of the retaining surface 14 must not be smaller than that of the spherical surface (must not be larger in the curvature radius) of the ball portion 5, and therefore particularly high machining accuracy over the above-mentioned limit is not required. The fitting accuracy of the latter, that is, the fitting accuracy of the shift-lever supporting section 2 and the elastic displacement section 10, is required to be high enough to provide some clearance between these parts so that the elastic displacement section 10 can be pushed to open wider. A high machining accuracy, therefore, is not required in this section.

Two members are used for holding the ball portion 5 of the shift lever 4, including the shift-lever supporting section 2 formed integral with the body 1 and the retaining member 7 formed integral with the elastic displacement section 10 that forms the retaining surface 14. To these parts, the pins 17 are added as fastening means. Namely, few number of parts is needed, thereby facilitating assembly work.

Furthermore, because the operating load of the shift lever 4 is provided by the elastic force of the elastic displacement section 10 and no high machining accuracy is required as described above, there exist only few factors that affect the operating load, and accordingly a stabilized operating load can be obtained.

Here, materials of the shift-lever supporting apparatus will be described. Since a comparatively great load is exerted to the body 1 and parts formed integral with the body 1 when the shift lever 4 is operated, it is desirable to make the body of the shift-lever supporting apparatus and the related parts of metals in order to increase their mechanical strength. In the meantime the retaining member 7 and parts formed integral with this retaining member are not required to have a high mechanical strength and are of simple shape, and therefore they can be manufactured of non-metallic materials such as synthetic resins.

In the aforementioned constitution, more reliable movement of the shift lever 4 can be ensured due to the frictional force and grease lubrication between the ball-portion 5 and the receiving surface 6 by filling grease (not shown) in the slits 12 provided by dividing the elastic displacement section 10 into plurality of cantilever type tongue sections 13.

According to the present invention, as described above, because of the constitution of the shift-lever supporting apparatus that the shift lever operating load is provided by utilizing the elastic force of the elastic displacement section, high machining accuracy is not demanded, and, accordingly, machining can easily be performed, resulting in enhanced productivity. Also, wear of the ball portion can be absorbed by the displacement of the elastic displacement section even when the ball portion is worn as it slidingly rotates, thereby enabling the stabilization of the shift lever operating load for a prolonged period of time. Furthermore, since, in this invention, the seats and the spring pressing the seats that are required in prior-art shift-lever supporting apparatus are no more necessary, it is possible to reduce the number of parts and accordingly to facilitate assembling operation. Generally speaking, according to this invention, shift-lever supporting apparatus of improved productivity are obtainable at a low cost.

What is claimed is:

1. An apparatus for supporting a shift lever for a transmission, the shift lever including a ball-like portion provided at an intermediate portion of the shift lever, the ball-like portion having a lower spherical surface of a fixed curvature on at least a part of a lower side thereof and an upper spherical surface on a part of an upper side thereof, said apparatus for supporting a shift lever comprising:

a cylindrical shift-lever supporting section in which said ball-like portion is inserted;

a projecting section formed on the inner surface of said shift-lever supporting section to form a receiving surface, the receiving surface having a concave partial spherical surface of nearly the same curvature as the lower spherical surface of said ball-like portion and being in contact with said lower spherical surface;

a cap section detachably attached to an open upper end of said shift-lever supporting section; and a plurality of tongue sections separated by slits and extending along a direction substantially parallel with a center axis of said shift lever, said tongue sections projecting downward from the cap section and being able to elastically deform, said tongue sections forming a retaining surface which has a concave partial spherical surface in surface contact with the upper spherical surface of said ball-like portion such that said ball-like portion is held between said concave spherical surface and said receiving surface, wherein the diameter of said retaining surface is smaller than the outer diameter of the ball-like portion, and wherein the tongue sections elastically deform when they touch and retain the upper spherical surface of the ball-like portion.

2. An apparatus for supporting a shift lever for a transmission according to claim 1, further comprising a body section formed integral with said shift-lever supporting section, and a flange section formed integral with said cap section so as to be located on the outer peripheral side of said shift-lever supporting section, wherein said cap section is attached to said body section by pins inserted in said flange section.

3. An apparatus for supporting a shift lever for a transmission according to claim 1, wherein the cap section and the tongue sections are integrally formed and are made of synthetic resin.

4. An apparatus for supporting a shift lever for a transmission according to claim 1, wherein a grease is filled in the slits.

5. An apparatus for supporting a shift lever for a transmission according to claim 1, wherein said tongue sections do not extend downward, relative to said ball-like portion, substantially beyond said upper portion.

* * * * *

UNITED STATES PATENT AND TRADEMARK OFFICE
CERTIFICATE OF CORRECTION

PATENT NO. : 5,024,117

DATED : June 18, 1991

INVENTOR(S) : Ichiji Yamada et al.

It is certified that error appears in the above-identified patent and that said Letters Patent is hereby corrected as shown below:

On the title page, item [75] Inventors: please correct the fifth inventor's name to read as follows:

-- Ryo Tanahashi--.

Signed and Sealed this

Sixth Day of October, 1992

Attest:

DOUGLAS B. COMER

*Attesting Officer*    *Acting Commissioner of Patents and Trademarks*